US012591907B2

(12) United States Patent
Rajendran

(10) Patent No.: US 12,591,907 B2
(45) Date of Patent: Mar. 31, 2026

(54) SYSTEM AND METHOD TO DETECT A GAZE AT AN OBJECT BY UTILIZING AN IMAGE SENSOR

(71) Applicant: E-CON SYSTEMS INDIA PRIVATE LIMITED, Chennai (IN)

(72) Inventor: Parthasarathy Rajendran, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 434 days.

(21) Appl. No.: 18/453,389

(22) Filed: Aug. 22, 2023

(65) Prior Publication Data

US 2023/0394521 A1 Dec. 7, 2023

Related U.S. Application Data

(63) Continuation of application No. 17/577,758, filed on Jan. 18, 2022, now abandoned.

(51) Int. Cl.
| | |
|---|---|
| *G06Q 30/0242* | (2023.01) |
| *G06F 3/01* | (2006.01) |
| *G06T 7/70* | (2017.01) |
| *G06T 7/80* | (2017.01) |

(52) U.S. Cl.
CPC ......... *G06Q 30/0242* (2013.01); *G06F 3/013* (2013.01); *G06T 7/70* (2017.01); *G06T 7/80* (2017.01); *G06T 2207/30196* (2013.01)

(58) Field of Classification Search
CPC ..... G06Q 30/0242; G06F 3/013; G06F 3/012; G06F 3/0304; G06T 7/70; G06T 7/80; G06T 2207/30196; G06T 2207/10016; G06T 2207/30201
See application file for complete search history.

(56) References Cited

U.S. PATENT DOCUMENTS

| | | | | |
|---|---|---|---|---|
| 10,534,954 | B2 * | 1/2020 | Kaehler | G06V 20/20 |
| 10,586,208 | B2 * | 3/2020 | Buibas | G06T 7/74 |
| 11,019,246 | B2 | 5/2021 | Sivan | |
| 11,830,259 | B2 * | 11/2023 | Ren | G06V 40/171 |
| 2010/0033333 | A1 | 2/2010 | Victor et al. | |

(Continued)

OTHER PUBLICATIONS

Zhanshi, Zimingxu; A Method for Detecting Pedestrian Height and Distance Based on Monocular Vision Technology; Mar. 22, 2022.

*Primary Examiner* — Stephen R Koziol
*Assistant Examiner* — Dylan J Sherrillo
(74) *Attorney, Agent, or Firm* — Jason C. Cameron

(57) ABSTRACT

A system to detect a gaze at an object by utilizing an image sensor is disclosed. The system includes a processing subsystem including a detection module to detect at least one face of a person. The detection module is to identify a gender of the person. The processing subsystem includes a depth estimator module to estimate a distance of the person from the image sensor. The processing subsystem includes a height estimator module to estimate a height of the person. The processing subsystem also includes a horizontal position estimator module to estimate a relative position of the person with respect to the image sensor. The processing subsystem includes a computing module to compute a range of pitch angle and a range of yaw angle. The processing subsystem includes a recognizing module to recognize the gaze of the person.

19 Claims, 9 Drawing Sheets

(56)          References Cited

U.S. PATENT DOCUMENTS

2019/0317594 A1    10/2019  Stent
2020/0058136 A1     2/2020  Morishita
2022/0114868 A1*    4/2022  Bronicki ............ G06Q 30/0623
2022/0122493 A1*    4/2022  Adato .................... G06V 40/10

* cited by examiner

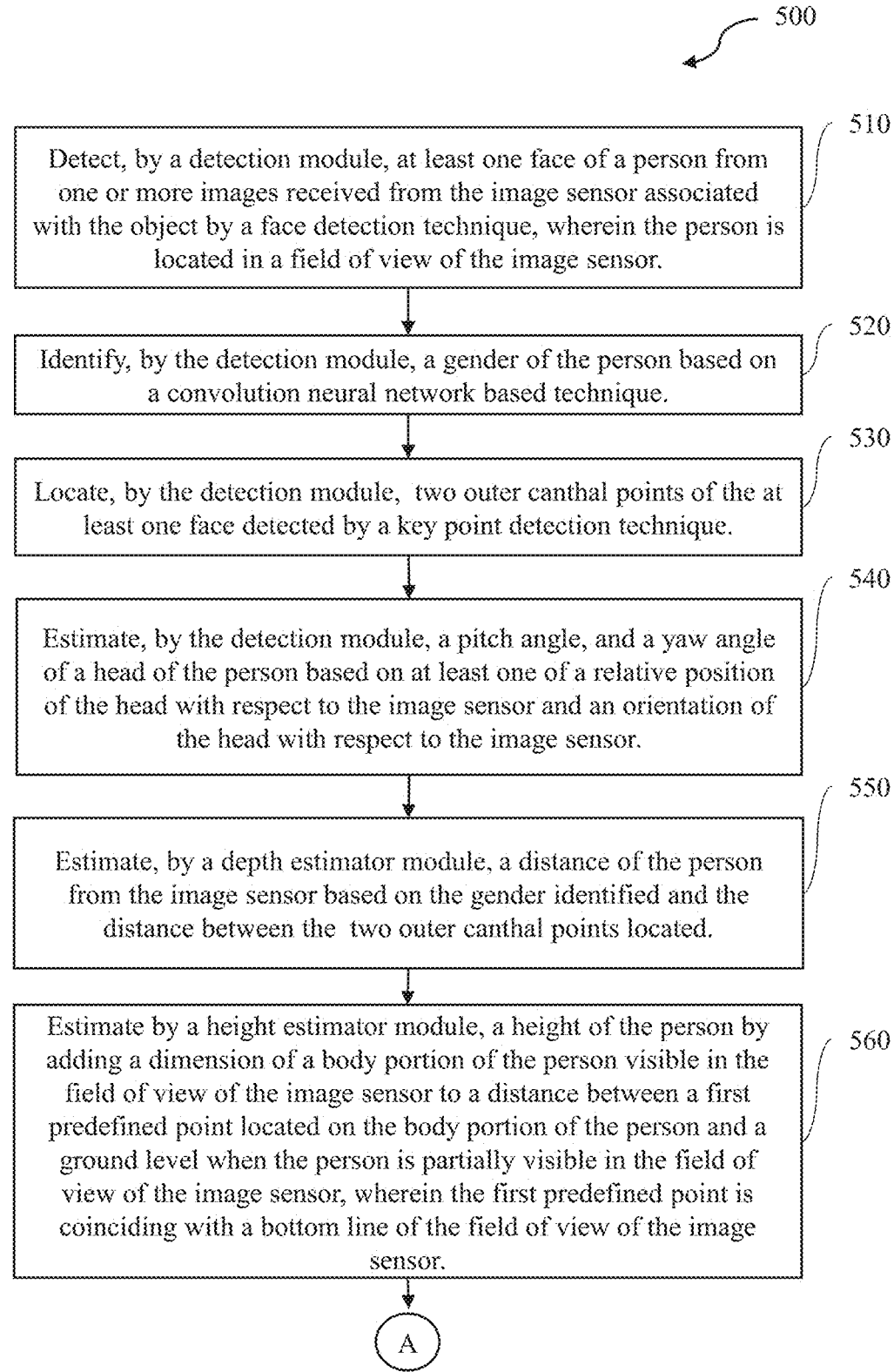

500

510

Detect, by a detection module, at least one face of a person from one or more images received from the image sensor associated with the object by a face detection technique, wherein the person is located in a field of view of the image sensor.

520

Identify, by the detection module, a gender of the person based on a convolution neural network based technique.

530

Locate, by the detection module, two outer canthal points of the at least one face detected by a key point detection technique.

540

Estimate, by the detection module, a pitch angle, and a yaw angle of a head of the person based on at least one of a relative position of the head with respect to the image sensor and an orientation of the head with respect to the image sensor.

550

Estimate, by a depth estimator module, a distance of the person from the image sensor based on the gender identified and the distance between the two outer canthal points located.

560

Estimate by a height estimator module, a height of the person by adding a dimension of a body portion of the person visible in the field of view of the image sensor to a distance between a first predefined point located on the body portion of the person and a ground level when the person is partially visible in the field of view of the image sensor, wherein the first predefined point is coinciding with a bottom line of the field of view of the image sensor.

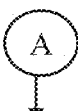

570

Estimate, by the height estimator module, the height of the person by subtracting a first distance from the dimension of the body portion of the person visible in the field of view of the image sensor when the person is located within the field of view of the image sensor at a second predefined point located in the ground level, wherein the second predefined point is located at a second distance from a third predefined point located in the ground level, wherein the third predefined point is coinciding with the bottom line of the field of view of the image sensor, wherein the first distance comprises a perpendicular distance between the ground level and a point of intersection of a vertical axis of the person and the bottom line of the image sensor.

580

Estimate, by a horizontal position estimator module, a relative position of the person with respect to at least one of a right edge of the field of view of the image sensor and a left edge of the field of view of the image sensor.

590

Compute, by a computing module, a range of pitch angle and a range of yaw angle based on the distance of the person from the image sensor estimated, the height of the person estimated, the relative position of the person estimated, length of the object, and width of the object.

600

Recognize, by a recognizing module, the gaze of the person when the pitch angle and the yaw angle of the head of the person estimated falls within the range of pitch angle and the range of yaw angle computed, thereby detecting the gaze of the person by employing the image sensor.

FIG. 8b

SYSTEM AND METHOD TO DETECT A GAZE AT AN OBJECT BY UTILIZING AN IMAGE SENSOR

CROSS REFERENCE TO RELATED APPLICATIONS

This application is a continuation-in-part of U.S. patent application and claims priority benefit of, pending United States Non-Provisional Specification bearing application Ser. No. 17/577,758 filed on Jan. 18, 2022 entitled "GAZE ESTIMATION SYSTEM AND METHOD THEREOF" which is hereby incorporated by reference in its entirety.

FIELD OF INVENTION

Embodiments of the present disclosure relate to a field of detecting behavior of the user and more particularly to a system and method to detect a gaze at an object by utilizing an image sensor.

BACKGROUND

Advertisement is a marketing communication which employs a sponsored, non-personal message to promote or sell products, services, or ideas. Sponsors of the advertisement includes businesses intending to promote the products and the services. The advertisement is communicated via an online medium and an offline medium. The online medium includes blogs, social media, websites, and the like. The offline medium includes billboards, pamphlets, television, and the like.

Engagement metrices of the advertisement is used by the sponsors to quantify effectiveness of the advertisement. In order to quantify the engagement metrices of the advertisement communicated through the billboards, stereoscopic cameras are being used. The stereoscopic cameras are bulky and expensive. Apart from that, power consumption of the stereoscopic cameras is significant. Further, as stereoscopic cameras rely on multiple viewpoints, placement and orientation of the same is a difficult task. Additionally, computational resources required to process the data provided by the stereoscopic cameras are expensive. Also, processing of the data in the remote serves affects data security.

Hence, there is a need for an improved system and a method to detect a gaze at an object by utilizing an image sensor to address the aforementioned issue(s).

OBJECTIVE OF THE INVENTION

An objective of the invention is to provide a system and a method to detect a gaze at an object by utilizing an image sensor.

BRIEF DESCRIPTION

In accordance with an embodiment of the present disclosure, a system to detect a gaze at an object by utilizing an image sensor is provided. The system includes a processing subsystem hosted on a server and configured to control bidirectional communications among a plurality of modules. The processing subsystem includes a detection module operatively coupled to an integrated database. The detection module is configured to detect at least one face of a person from one or more images received from the image sensor associated with the object by a face detection technique. The person is located in a field of view of the image sensor. The detection module is also configured to identify a gender of the person based on a convolution neural network based technique. The detection module is further configured to locate two outer canthal points of the at least one face detected by a key point detection technique. The detection module is also configured to estimate a pitch angle and a yaw angle of a head of the person based on at least one of a relative position of the head with respect to the image sensor and an orientation of the head with respect to the image sensor. The processing subsystem also includes a depth estimator module operatively coupled to the detection module. The depth estimator module is configured to estimate a distance of the person from the image sensor based on the gender identified and the distance between the two outer canthal points located. The processing subsystem also includes a height estimator module operatively coupled to the depth estimator module. The height estimator module is configured to estimate a height of the person by adding a dimension of a body portion of the person visible in the field of view of the image sensor to a distance between a first predefined point located on the body portion of the person and a ground level when the person is partially visible in the field of view of the image sensor. The first predefined point is coinciding with a bottom line of the field of view of the image sensor. The height estimator module is also configured to estimate the height of the person by subtracting a first distance from the dimension of the body portion of the person visible in the field of view of the image sensor when the person is located within the field of view of the image sensor at a second predefined point located in the ground level. The second predefined point is located at a second distance from a third predefined point located in the ground level. The third predefined point is coinciding with the bottom line of the field of view of the image sensor. The first distance includes a perpendicular distance between the ground level and a point of intersection of a vertical axis of the person and the bottom line of the image sensor. The processing subsystem also includes a horizontal position estimator module operatively coupled to the height estimator module. The horizontal position estimator module is configured to estimate a relative position of the person with respect to at least one of a right edge of the field of view of the image sensor and a left edge of the field of view of the image sensor. The processing subsystem also includes a computing module operatively coupled to the horizontal position estimator module. The computing module is configured to compute a range of pitch angle and a range of yaw angle based on the distance of the person from the image sensor estimated, the height of the person estimated, the relative position of the person estimated, length of the object, and width of the object. The processing subsystem also includes a recognizing module configured to recognize the gaze of the person when the pitch angle and the yaw angle of the head of the person estimated falls within the range of pitch angle and the range of yaw angle computed, thereby detecting the gaze of the person by employing the image sensor.

In accordance with another embodiment of the present disclosure, a method to detect a gaze at an object by utilizing an image sensor is provided. The method includes detecting, by a detection module, at least one face of a person from one or more images received from the image sensor associated with the object by a face detection technique. The person is located in a field of view of the image sensor. The method also includes identifying, by the detection module, a gender of the person based on a convolution neural network based technique. The method further includes locating, by the detection module, two outer canthal points of the at least one face detected by a key point detection technique. The method also includes estimating, by the detection module, a pitch angle, and a yaw angle of a head of the person based on at least one of a relative position of the head with respect to the image sensor and an orientation of the head with respect to the image sensor. The method further includes estimating, by a depth estimator module, a distance of the person from the image sensor based on the gender identified and the distance between the two outer canthal points located. The method also includes estimating by a height estimator module, a height of the person by adding a dimension of a body portion of the person visible in the field of view of the image sensor to a distance between a first predefined point located on the body portion of the person and a ground level when the person is partially visible in the field of view of the image sensor. The first predefined point is coinciding with a bottom line of the field of view of the image sensor. The method also includes estimating, by the height estimator module, the height of the person by subtracting a first distance from the dimension of the body portion of the person visible in the field of view of the image sensor when the person is located within the field of view of the image sensor at a second predefined point located in the ground level. The second predefined point is located at a second distance from a third predefined point located in the ground level. The third predefined point is coinciding with the bottom line of the field of view of the image sensor. The first distance includes a perpendicular distance between the ground level and a point of intersection of a vertical axis of the person and the bottom line of the image sensor. The method also includes estimating, by a horizontal position estimator module, a relative position of the person with respect to at least one of a right edge of the field of view of the image sensor and a left edge of the field of view of the image sensor. The method also includes computing, by a computing module, a range of pitch angle and a range of yaw angle based on the distance of the person from the image sensor estimated, the height of the person estimated, the relative position of the person estimated, length of the object, and width of the object. The method further includes recognizing, by a recognizing module, the gaze of the person when the pitch angle and the yaw angle of the head of the person estimated falls within the range of pitch angle and the range of yaw angle computed, thereby detecting the gaze of the person by employing the image sensor.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 8a is a flow chart representing the steps involved in a method to detect a gaze at an object by utilizing an image sensor in accordance with an embodiment of the present disclosure; and FIG. 8 (b) is a flow chart representing the continued steps involved in a method of FIG. 8 (a), in accordance with an embodiment of the present disclosure.

Figure 1:
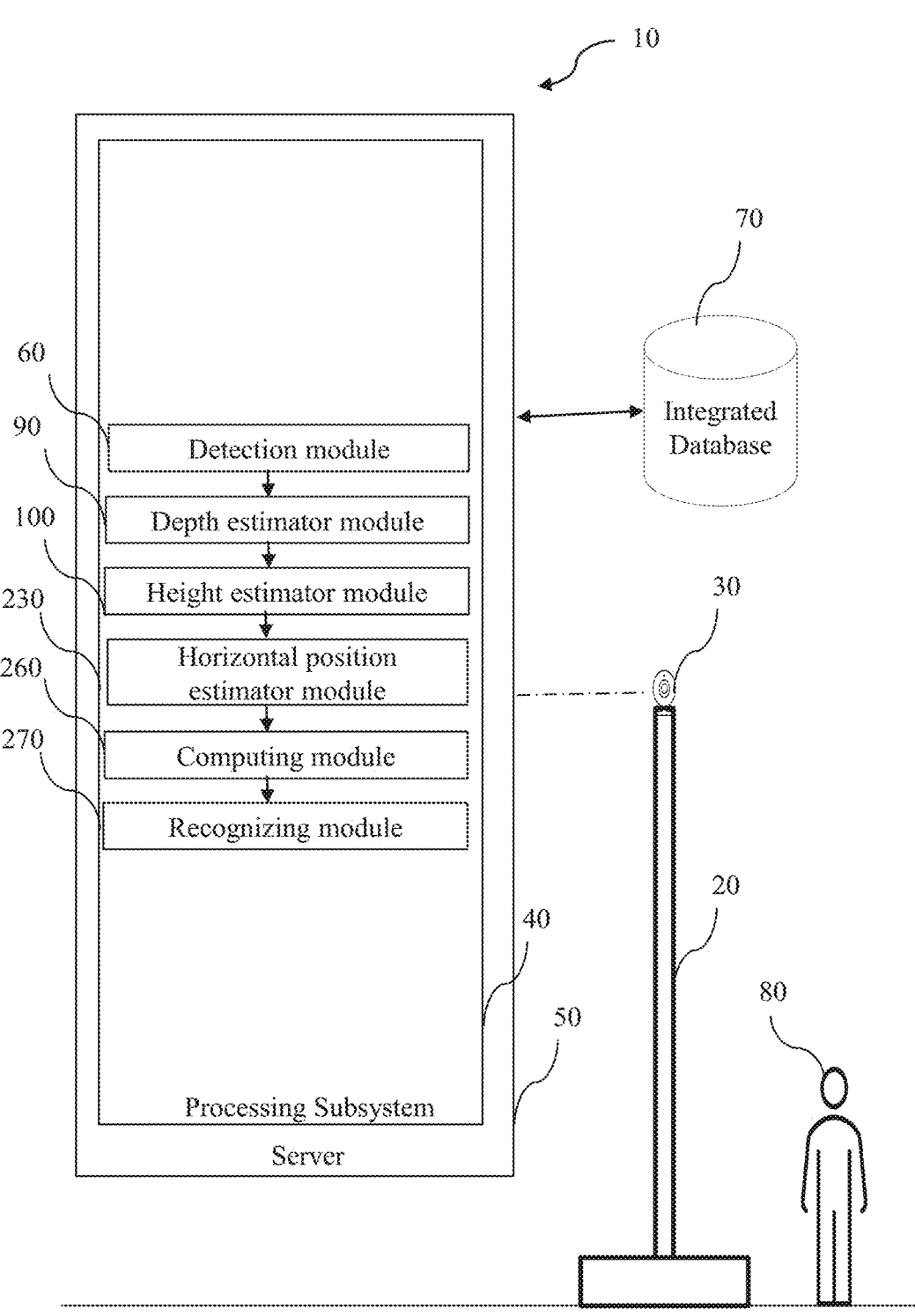
FIG. 1 is a block diagram representation of a system to detect a gaze at an object by utilizing an image sensor in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to detect a gaze at an object by utilizing an image sensor. The system includes a processing subsystem hosted on a server and configured to control bidirectional communications among a plurality of modules. The processing subsystem includes a detection module operatively coupled to an integrated database. The detection module is configured to detect at least one face of a person from one or more images received from the image sensor associated with the object by a face detection technique. The person is located in a field of view of the image sensor. The detection module is also configured to identify a gender of the person based on a convolution neural network based technique. The detection module is further configured to locate two outer canthal points of the at least one face detected by a key point detection technique. The detection module is also configured to estimate a pitch angle and a yaw angle of a head of the person based on at least one of a relative position of the head with respect to the image sensor and an orientation of the head with respect to the image sensor. The processing subsystem also includes a depth estimator module operatively coupled to the detection module. The depth estimator module is configured to estimate a distance of the person from the image sensor based on the gender identified and the distance between the two outer canthal points located. The processing subsystem also includes a height estimator module operatively coupled to the depth estimator module. The height estimator module is configured to estimate a height of the person by adding a dimension of a body portion of the person visible in the field of view of the image sensor to a distance between a first predefined point located on the body portion of the person and a ground level when the person is partially visible in the field of view of the image sensor. The first predefined point is coinciding with a bottom line of the field of view of the image sensor. The height estimator module is also configured to estimate the height of the person by subtracting a first distance from the dimension of the body portion of the person visible in the field of view of the image sensor when the person is located within the field of view of the image sensor at a second predefined point located in the ground level. The second predefined point is located at a second distance from a third predefined point located in the ground level. The third predefined point is coinciding with the bottom line of the field of view of the image sensor. The first distance includes a perpendicular distance between the ground level and a point of intersection of a vertical axis of the person and the bottom line of the image sensor. The processing subsystem also includes a horizontal position estimator module operatively coupled to the height estimator module. The horizontal position estimator module is configured to estimate a relative position of the person with respect to at least one of a right edge of the field of view of the image sensor and a left edge of the field of view of the image sensor. The processing subsystem also includes a computing module operatively coupled to the horizontal position estimator module. The computing module is configured to compute a range of pitch angle and a range of yaw angle based on the distance of the person from the image sensor estimated, the height of the person estimated, the relative position of the person estimated, length of the object, and width of the object. The processing subsystem also includes a recognizing module configured to recognize the gaze of the person when the pitch angle and the yaw angle of the head of the person estimated falls within the range of pitch angle and the range of yaw angle computed, thereby detecting the gaze of the person by employing the image sensor.

FIG. 1 is a block diagram representation of a system 10 to detect a gaze at an object 20 by utilizing an image sensor 30 in accordance with an embodiment of the present disclosure. In one embodiment, the object 20 may include at least one of a billboard, a signage, and a display. In some embodiments, the image sensor 30 may be mounted on the object 20. The system 10 includes a processing subsystem 40 hosted on a server 50 and configured to control bidirectional communications among a plurality of modules. In one embodiment, the server 50 may include a cloud server. In some embodiments, the server 50 may include a local server. The processing subsystem 40 includes a detection module 60 operatively coupled to an integrated database 70. In one embodiment, the integrated database 70 may include a columnar database. In some embodiments, the integrated database 70 may include a relational database. In a specific embodiment, the integrated database 70 may include a non-relational database. In some embodiments, the integrated database 70 may include a hierarchical database.

Further, the detection module 60 is configured to detect at least one face of a person 80 from one or more images received from the image sensor 30 associated with the object 20 by a face detection technique. In one embodiment, the image sensor 30 may include a monocular camera. In some embodiments, the face detection technique includes, but is not limited to, viola-jones technique, neural networks, histogram of oriented gradients, convolutional neural networks, template matching techniques, skin colour analysis, and the like. The person 80 is located in a field of view of the image sensor 30. The detection module 60 is also configured to identify a gender of the person 80 based on a convolution neural network based technique.

Further, the detection module 60 is configured to locate two outer canthal points of the at least one face detected by a key point detection technique. In one embodiment, the key point detection technique may include at least one of a haar cascade classifiers, facial landmark detection, template matching, hough transform, and active appearance models. The detection module 60 is also configured to estimate a pitch angle and a yaw angle of a head of the person 80 based on at least one of a relative position of the head with respect to the image sensor 30 and an orientation of the head with respect to the image sensor 30. The processing subsystem 40 also includes a depth estimator module 90 operatively coupled to the detection module 60.

Additionally, the depth estimator module 90 is configured to estimate a distance of the person 80 from the image sensor 30 based on the gender identified and the distance between the two outer canthal points located. The processing subsystem 40 also includes a height estimator module 100 operatively coupled to the depth estimator module 90. The working of the height estimator module 100 when the person 80 is partially visible in the field of view of the image sensor 30 is explained in detail along with FIG. 2.

Figure 2:
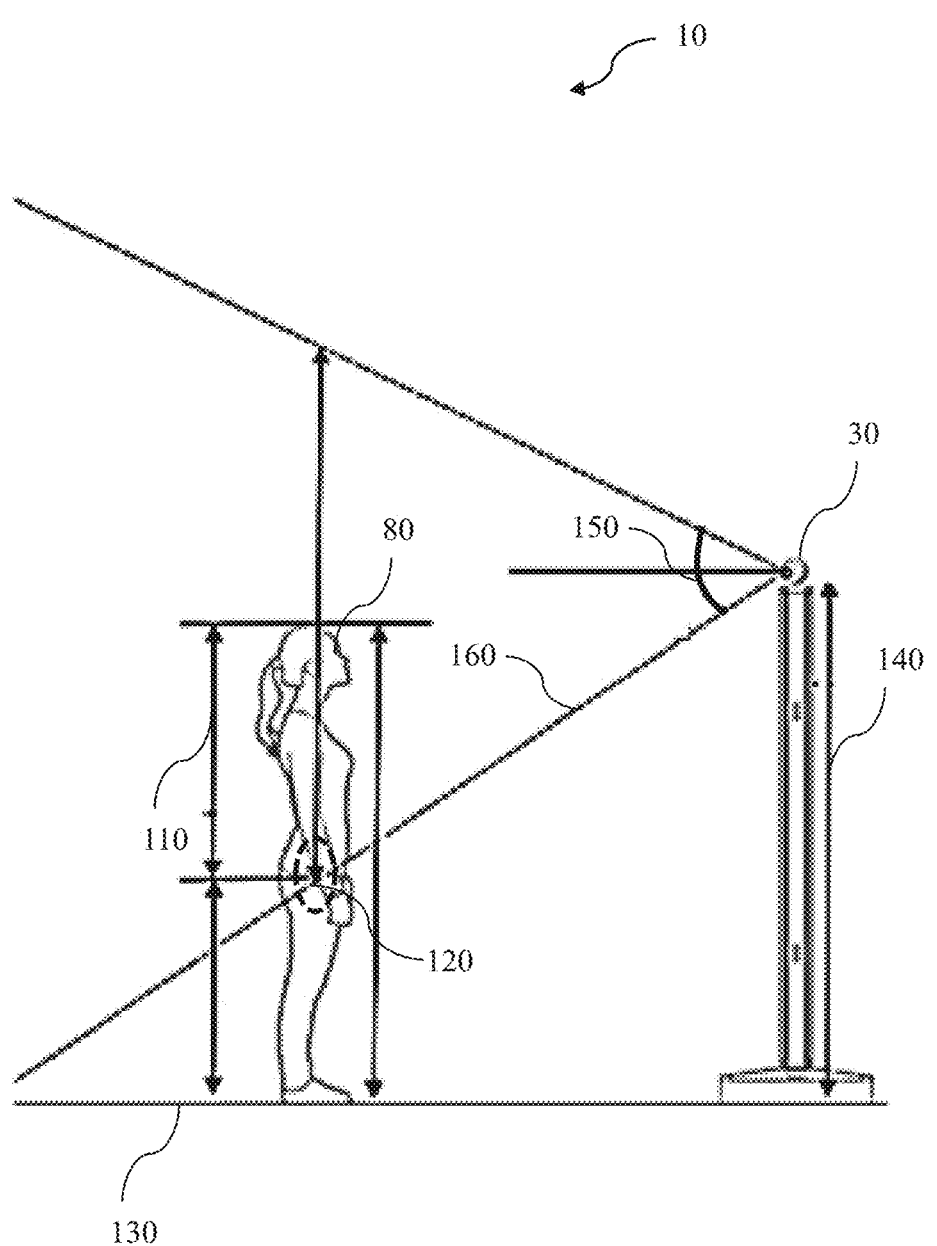
FIG. 2 is a schematic representation of one embodiment of the system of FIG. 1, depicting a person partially visible in a field of view of the image sensor in accordance with an embodiment of the present disclosure.

FIG. 2 is a schematic representation of one embodiment of the system 10 of FIG. 1, depicting the person 80 partially visible in the field of view of the image sensor 30 in accordance with an embodiment of the present disclosure. The height estimator module 100 is configured to estimate a height of the person 80 by adding a dimension of a body portion 110 of the person 80 visible in the field of view 150 of the image sensor 30 to a distance between a first pre-defined point 120 located on the body portion of the person 80 and a ground level 130 when the person 80 is partially visible in the field of view 150 of the image sensor 30.

Further, in one embodiment, the distance between the first predefined point 120 on the body of the person 80 and the ground level 130 is calculated by subtracting a first result from a height 140 of the image sensor 30 from the ground level 130. In such an embodiment, the first result may include a result obtained by multiplying the distance of the person 80 from the image sensor 30 estimated with a tangent of half of the field of view 150 of the image sensor 30. The first predefined point 120 coincides with a bottom line 160 of the field of view 150 of the image sensor 30. The working of the height estimator module 100 when the person 80 is completely visible in the field of view 150 of the image sensor 30 is explained in detail along with FIG. 3.

Figure 3:
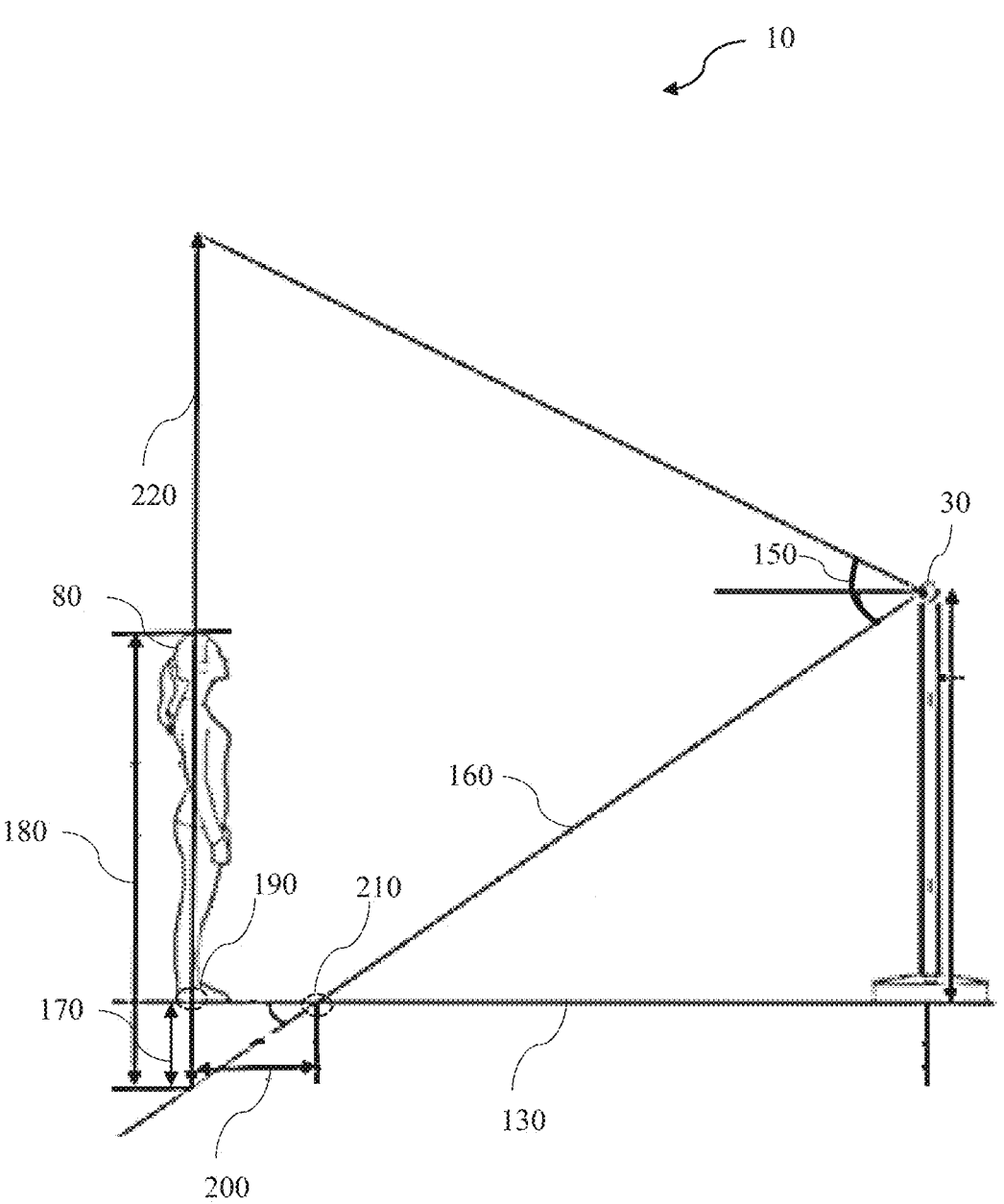
FIG. 3 is a schematic representation of another embodiment of the system of FIG. 1, depicting the person completely visible in the field of view of the image sensor in accordance with an embodiment of the present disclosure.

FIG. 3 is a schematic representation of one embodiment of the system 10 of FIG. 1, depicting the person 80 is completely visible in the field of view 150 of the image sensor 30 in accordance with an embodiment of the present disclosure. The height estimator module 100 is also config-ured to estimate the height of the person 80 by subtracting a first distance 170 from the dimension 180 of the body portion of the person 80 visible in the field of view 150 of the image sensor 30 when the person 80 is located within the field of view 150 of the image sensor 30 at a second predefined point 190 located in the ground level 130. The second predefined 190 point is located at a second distance 200 from a third predefined point 210 located in the ground level 130. The third predefined point 210 coincides with the bottom line 160 of the field of view 150 of the image sensor 30. The first distance 170 includes a perpendicular distance between the ground level 130 and a point of intersection of a vertical axis 220 of the person 80 and the bottom line 160 of the image sensor 30. In one embodiment, the dimension 180 of the body portion of the person 80 visible in the field of view of the image sensor 30 may include a length of the body portion.

Further, in some embodiments, the dimension of the body portion of the person 80 visible in the field of view 150 of the image sensor 30 may be calculated by multiplying a ratio with the field of view 150 of the image sensor 30 based on the distance of the person 80 from the image sensor 30 estimated. The ratio is obtained by dividing field of view in vertical direction with field of view in horizontal direction. In such an embodiment, the field of view 150 of the image sensor 30 may be calculated by multiplying the tangent of half of the field of view 150 of the image sensor 30 with double the distance of the person 80 from the image sensor 30 estimated.

Furthermore, in one embodiment, the first distance 170 may be calculated by multiplying the second distance 200 with the tangent of half of the field of view 150 of the image sensor 30. In such an embodiment, the second distance 200 may include a distance obtained by subtracting the distance between the third point 210 and the image sensor 30 from the distance of the person 80 from the image sensor 30 estimated. In one embodiment, the distance between the third point 210 and the image sensor 30 may be calculated by dividing the height 140 of the image sensor 30 from the ground level 130 by a tangent of half of the field of view 150 of the image sensor 30.

Referring back to the FIG. 1, the processing subsystem 40 also includes a horizontal position estimator module 230 operatively coupled to the height estimator module 100. The detailed working of the horizontal position estimator module 230 is explained using the FIG. 4.

Figure 4:
FIG. 4 is a schematic diagram representation of yet another embodiment of the system of FIG. 1, depicting a right edge and a left edge of the field of view of the image sensor in accordance with an embodiment of the present disclosure.
Figure 4:
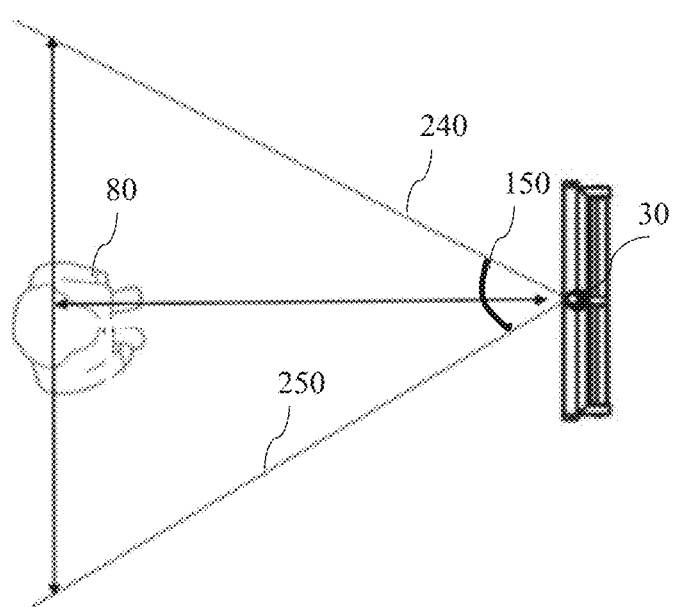

FIG. 4 is a schematic diagram representation of one embodiment of the system 10 of FIG. 1, depicting a right edge 240 and a left edge 250 of the field of view 150 of the image sensor 30 in accordance with an embodiment of the present disclosure. The horizontal position estimator module 230 is configured to estimate a relative position of the person 80 with respect to at least one of a right edge 240 of the field of view 150 of the image sensor 30 and a left edge 250 of the field of view 150 of the image sensor 30.

Referring back to the FIG. 1, the processing subsystem 40 includes a computing module 260 operatively coupled to the horizontal position estimator module 230. The computing module 260 is configured to compute a range of pitch angle and a range of yaw angle based on the distance of the person 80 from the image sensor 30 estimated, the height of the person 80 estimated, the relative position of the person 80 estimated, length of the object 20, and width of the object 20. The processing subsystem 40 also includes a recognizing module 270 configured to recognize the gaze of the person 80 when the pitch angle and the yaw angle of the head of the person 80 estimated falls within the range of pitch angle and the range of yaw angle computed, thereby detecting the gaze of the person 80 by employing the image sensor 30.

Figure 5:
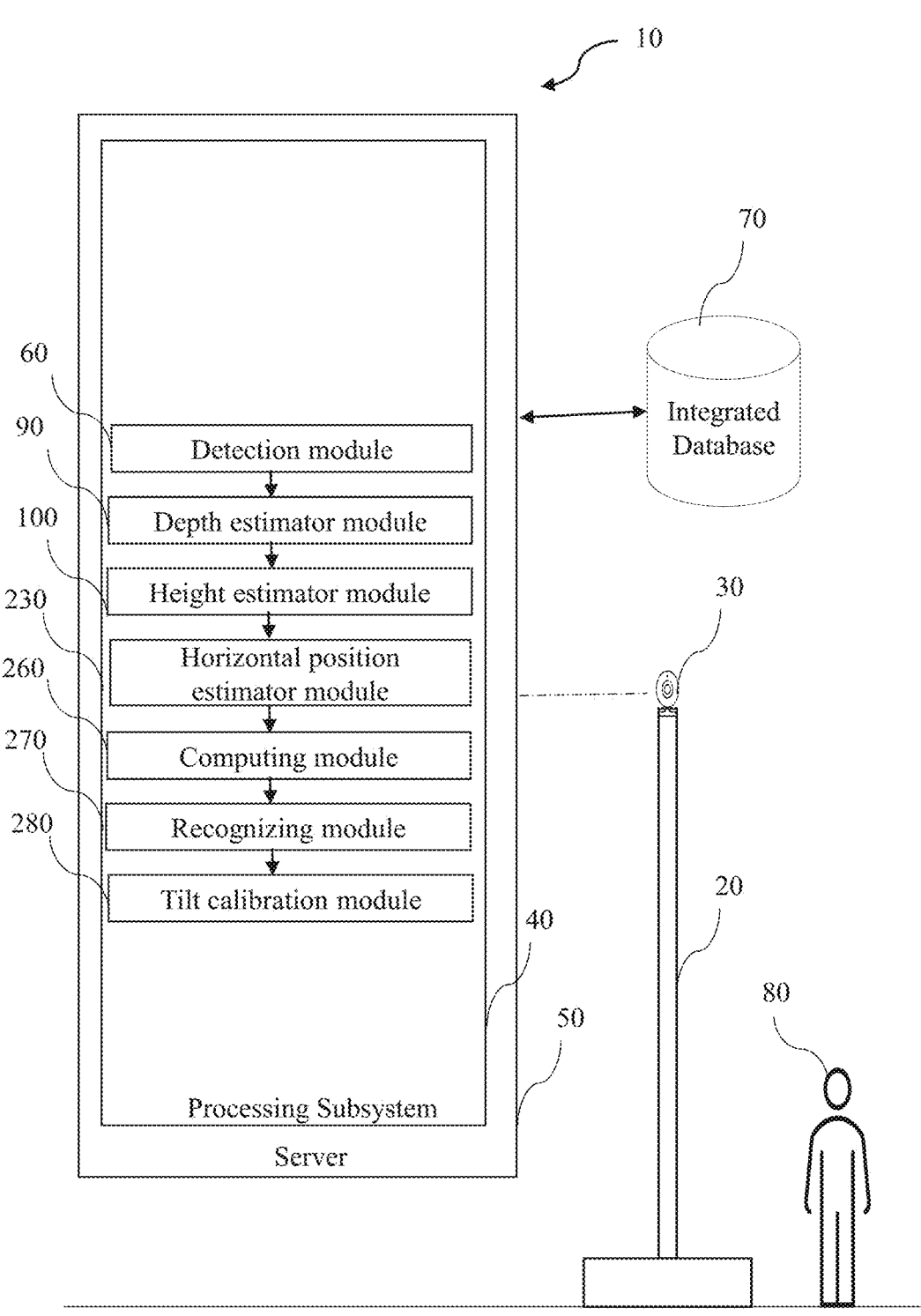
FIG. 5 is a block diagram representation of yet another embodiment of the system of FIG. 1, in accordance with an embodiment of the present disclosure.

FIG. 5 is a block diagram representation of one embodi-ment of the system 10 of FIG. 1, in accordance with an embodiment of the present disclosure. The system 10 of FIG. 1 includes the detection module 60, the depth estimator module 90, the height estimator module 100, the horizontal position estimator module 230, the computing module 260, and the recognizing module 270. In one embodiment, the system 10 of FIG. 1 may include the processing subsystem 40 including a tilt calibration module 280 configured to fine tune the height of the person 80 estimated and the relative position of the person 80 estimated by calculating a hori-zontal tilt of the image sensor 30 with respect to the ground level 130 and a vertical tilt of the image sensor 30 with respect to the ground level 130. In such an embodiment, the tilt calibration module 280 is configured to calculate the horizontal tilt of the image sensor 30 and the vertical tilt of the image sensor 30 based on the one or more images of a checker chart captured by the image sensor 30 upon placing the checker chart at one or more relative positions with respect to the image sensor 30.

Figure 6:
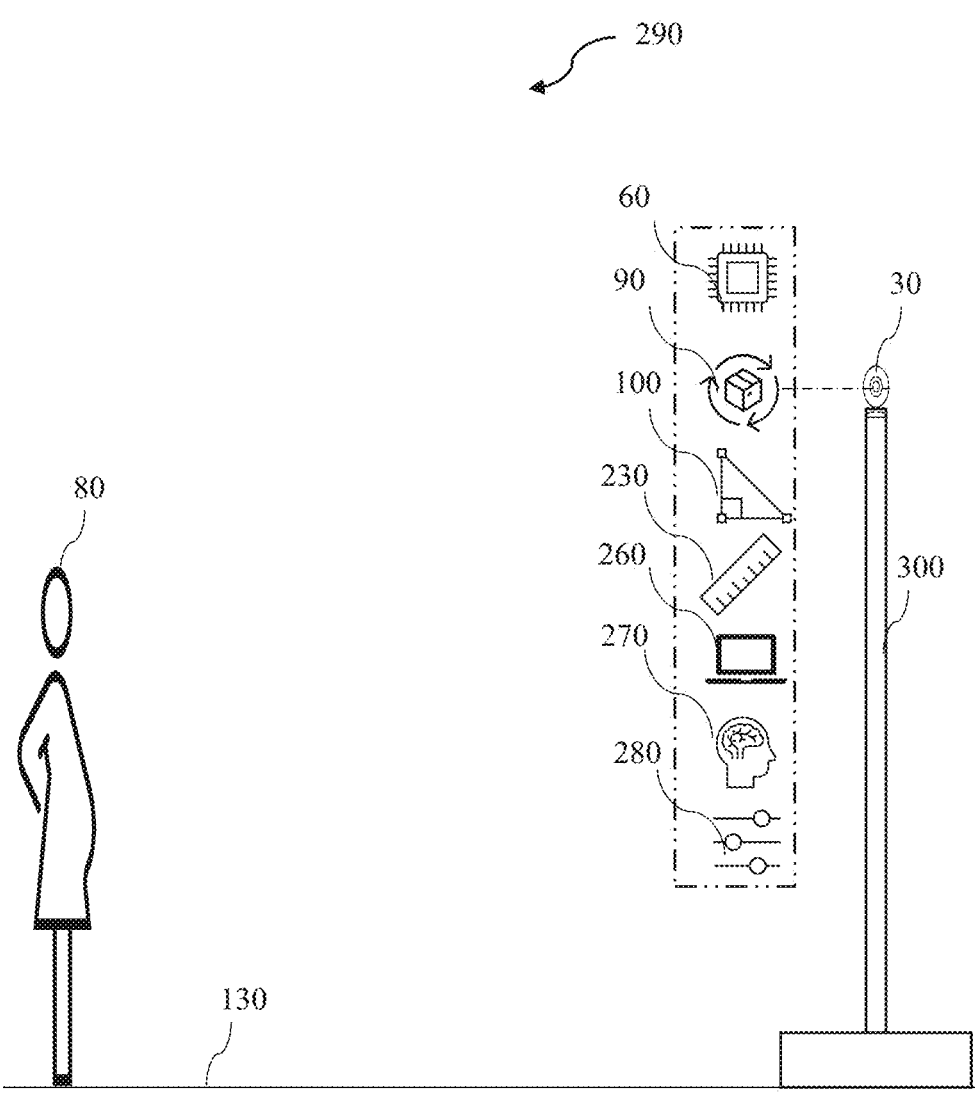
FIG. 6 is a schematic representation of an exemplary embodiment of the system of FIG. 1, in accordance with an embodiment of the present disclosure.

FIG. 6 is a schematic representation of an exemplary embodiment 290 of the system 10 of FIG. 1 in accordance with an embodiment of the present disclosure. Consider a scenario in which the image sensor 30 is mounted on a billboard 300. When the person 80 comes into the field of view of the image sensor 30, the detection module 60 may detect the person 80 from the one or more images received from the image sensor 30. The detection module 60 may identify the gender of the person 80 based on the convolu-tion neural network based technique. The detection module 60 may further locate the two outer canthal points of the person 80 along with estimating the pitch angle and the yaw angle of the head of the person 80. A depth estimator module 90 may estimate the distance of the person 80 from the image sensor 30 based on the gender and the distance between the two outer canthal points.

Additionally, the height estimator module 100 may esti-mate the height of the person 80. Upon estimating the height of the person 80, the horizontal position estimator module 230 may estimate the relative position of the person 80 with respect to the at least one of a right edge of the field of view of the image sensor 30 and a left edge of the field of view of the image sensor 30. The computing module 260 may compute the range of pitch angle and the range of yaw angle based on the distance of the person 80 from the image sensor 30, the height of the person 80, the relative position of the person 80 estimated, length of the billboard, and width of the billboard. Further, the recognizing module 270 may recognize the gaze of the person 80 when the pitch angle and the yaw angle of the head of the person 80 estimated falls within the range of pitch angle and the range of yaw angle computed. The tilt calibration module 280 may fine tune the height of the person 80 and the relative position of the person 80 by calculating the horizontal tilt of the image sensor 30 and the vertical tilt of the image sensor 30 with respect to the ground level 130.

Figure 7:
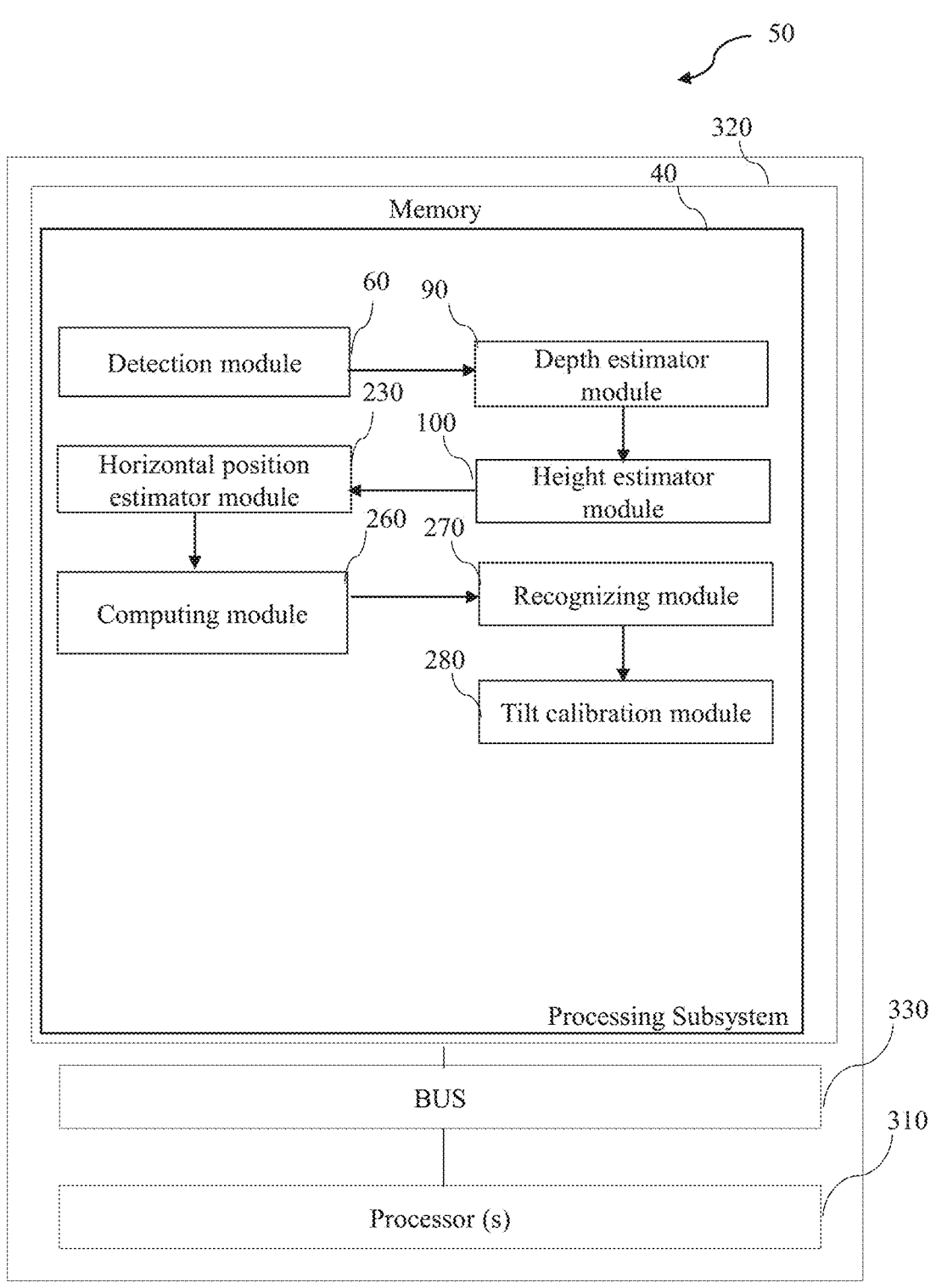
FIG. 7 is a block diagram of a computer or a server in accordance with an embodiment of the present disclosure.

FIG. 7 is a block diagram of a computer or a server 50 in accordance with an embodiment of the present disclosure. The server 50 includes processor(s) 310, and memory 320 operatively coupled to the bus 330. The processor(s) 310, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 320 includes several subsystems stored in the form of an executable program which instructs the processor to perform the method steps illustrated in FIG. 1. The memory 320 is substantially similar to the system 10 of FIG. 1. The memory 320 has the following subsystems: the processing subsystem 40 including the detection module 60, the depth estimator module 90, the height estimator module 100, the horizontal position estimator module 230, the computing module 260, the recognizing module 270 and the tilt calibration module 280. The plurality of modules of the processing subsystem 40 performs the functions as stated in FIG. 1 and FIG. 2. The bus 330 as used herein refers to be the internal memory 320 channels or computer network that is used to connect computer components and transfer data between them. The bus 330 includes a serial bus or a parallel bus, wherein the serial bus transmit data in bit-serial format and the parallel bus transmit data across multiple wires. The bus 330 as used herein may include but not limited to, a system bus, an internal bus, an external bus, an expansion bus, a frontside bus, a backside bus, and the like.

The processing subsystem 40 includes a detection module 60 operatively coupled to an integrated database 70. The detection module 60 is configured to detect at least one face of a person 80 from one or more images received from the image sensor 30 associated with the object 20 by a face detection technique. The person 80 is located in a field of view of the image sensor 30. The detection module 60 is also configured to identify a gender of the person 80 based on a convolution neural network based technique. The detection module 60 is further configured to locate two outer canthal points of the at least one face detected by a key point detection technique. The detection module 60 is also configured to estimate a pitch angle and a yaw angle of a head of the person 80 based on at least one of a relative position of the head with respect to the image sensor 30 and an orientation of the head with respect to the image sensor 30.

Further, the processing subsystem 40 includes a depth estimator module 90 operatively coupled to the detection module 60. The depth estimator module 90 is configured to estimate a distance of the person 80 from the image sensor 30 based on the gender identified and the distance between the two outer canthal points located. The processing subsystem 40 also includes a height estimator module 100 operatively coupled to the depth estimator module 90. The height estimator module 100 is configured to estimate a height of the person 80 by adding a dimension of a body portion of the person 80 visible in the field of view of the image sensor 30 to a distance between a first predefined point located on the body portion of the person 80 and a ground level when the person 80 is partially visible in the field of view of the image sensor 30. The first predefined point is coinciding with a bottom line of the field of view of the image sensor 30.

Moreover, the height estimator module 100 is configured to estimate the height of the person 80 by subtracting a first distance from the dimension of the body portion of the person 80 visible in the field of view of the image sensor 30 when the person 80 is located within the field of view of the image sensor 30 at a second predefined point located in the ground level. The second predefined point is located at a second distance from a third predefined point located in the ground level. The third predefined point is coinciding with the bottom line of the field of view of the image sensor 30. The first distance includes a perpendicular distance between the ground level and a point of intersection of a vertical axis of the person 80 and the bottom line of the image sensor 30. The processing subsystem 40 also includes a horizontal position estimator module 230 operatively coupled to the height estimator module 100. The horizontal position estimator module 230 is configured to estimate a relative position of the person 80 with respect to at least one of a right edge of the field of view of the image sensor 30 and a left edge of the field of view of the image sensor 30.

Additionally, the processing subsystem 40 includes a computing module 260 operatively coupled to the horizontal position estimator module 230. The computing module 260 is configured to compute a range of pitch angle and a range of yaw angle based on the distance of the person 80 from the image sensor 30 estimated, the height of the person 80 estimated, the relative position of the person 80 estimated, length of the object 20, and width of the object 20. The processing subsystem 40 also includes a recognizing module 270 configured to recognize the gaze of the person 80 when the pitch angle and the yaw angle of the head of the person 80 estimated falls within the range of pitch angle and the range of yaw angle computed, thereby detecting the gaze of the person 80 by employing the image sensor 30.

The processing subsystem 40 also includes a tilt calibration module 280 configured to fine tune the height of the person 80 estimated and the relative position of the person 80 estimated by calculating a horizontal tilt of the image sensor 30 with respect to the ground level and a vertical tilt of the image sensor 30 with respect to the ground level. The tilt calibration module 280 is configured to calculate the horizontal tilt of the image sensor 30 and the vertical tilt of the image sensor 30 based on the one or more images of a checker chart captured by the image sensor 30 upon placing the checker chart at one or more relative positions with respect to the image sensor 30.

Computer memory 320 elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 310.

FIG. 8a-8b is a flow chart representing the steps involved in a method 500 to detect a gaze at an object by utilizing an image sensor in accordance with an embodiment of the present disclosure. The method 500 includes detecting at least one face of a person from one or more images received from the image sensor associated with the object by a face detection technique in step 510. The person is located in a field of view of the image sensor. In one embodiment, detecting at least one face of a person from one or more images received from the image sensor associated with the object by a face detection technique includes detecting at least one face of a person from one or more images received from the image sensor associated with the object by a face detection technique.

Further, the object may include at least one of a billboard, a signage, and a display. In some embodiments, the image sensor may be mounted on the object. In one embodiment, the image sensor may include a monocular camera. In some embodiments, the face detection technique may include, but not limited to, viola-jones technique, neural networks, histogram of oriented gradients, convolutional neural networks, template matching techniques, skin colour analysis, and the like.

The method 500 also includes identifying a gender of the person based on a convolution neural network based technique in step 520. In one embodiment, identifying a gender of the person based on a convolution neural network based technique includes identifying a gender of the person based on a convolution neural network based technique by the detection module.

The method 500 also includes locating two outer canthal points of the at least one face detected by a key point detection technique in step 530. In one embodiment, locating two outer canthal points of the at least one face detected by a key point detection technique includes locating two outer canthal points of the at least one face detected by a key point detection technique by the detection module. In one embodiment, the key point detection technique may include at least one of a haar cascade classifiers, facial landmark detection, template matching, hough transform, and active appearance models.

The method 500 also includes estimating a pitch angle, and a yaw angle of a head of the person based on at least one of a relative position of the head with respect to the image sensor and an orientation of the head with respect to the image sensor in step 540. In one embodiment, estimating a pitch angle, and a yaw angle of a head of the person based on at least one of a relative position of the head with respect to the image sensor and an orientation of the head with respect to the image sensor includes estimating a pitch angle, and a yaw angle of a head of the person based on at least one of a relative position of the head with respect to the image sensor and an orientation of the head with respect to the image sensor by the detection module.

The method 500 also includes estimating a distance of the person from the image sensor based on the gender identified and the distance between the two outer canthal points located in step 550. In one embodiment, estimating a distance of the person from the image sensor based on the gender identified and the distance between the two outer canthal points located includes estimating a distance of the person from the image sensor based on the gender identified and the distance between the two outer canthal points located by a depth estimator module.

The method 500 also includes estimating a height of the person by adding a dimension of a body portion of the person visible in the field of view of the image sensor to a distance between a first predefined point located on the body portion of the person and a ground level when the person is partially visible in the field of view of the image sensor in step 560. In one embodiment, estimating a height of the person by adding a dimension of a body portion of the person visible in the field of view of the image sensor to a distance between a first predefined point located on the body portion of the person and a ground level when the person is partially visible in the field of view of the image sensor includes estimating a height of the person by adding a dimension of a body portion of the person visible in the field of view of the image sensor to a distance between a first predefined point located on the body portion of the person and a ground level when the person is partially visible in the field of view of the image sensor by a height estimator module. The first predefined point is coinciding with a bottom line of the field of view of the image sensor. In one embodiment, the distance between the first predefined point on the body of the person and the ground level is calculated by subtracting a first result from a height of the image sensor from the ground level. In such an embodiment, the first result may include a result obtained by multiplying the distance of the person from the image sensor estimated with a tangent of half of the field of view of the image sensor.

The method 500 also includes estimating the height of the person by subtracting a first distance from the dimension of the body portion of the person visible in the field of view of the image sensor when the person is located within the field of view of the image sensor at a second predefined point located in the ground level in step 570. In one embodiment, estimating the height of the person by subtracting a first distance from the dimension of the body portion of the person visible in the field of view of the image sensor when the person is located within the field of view of the image sensor at a second predefined point located in the ground level includes estimating the height of the person by subtracting a first distance from the dimension of the body portion of the person visible in the field of view of the image sensor when the person is located within the field of view of the image sensor at a second predefined point located in the ground level by the height estimator module. The second predefined point is located at a second distance from a third predefined point located in the ground level, The third predefined point is coinciding with the bottom line of the field of view of the image sensor.

Further, the first distance includes a perpendicular distance between the ground level and a point of intersection of a vertical axis of the person and the bottom line of the image sensor. In one embodiment, the dimension of the body portion of the person visible in the field of view of the image sensor may include a length of the body portion. In some embodiments, the dimension of the body portion of the person visible in the field of view of the image sensor may be calculated by multiplying a ratio with the field of view of the image sensor based on the distance of the person from the image sensor estimated, wherein the ratio is obtained by dividing Fy/Fh. In such an embodiment, the field of view of the image sensor may be calculated by multiplying a tangent of half of the field of view of the image sensor with double the distance of the person from the image sensor estimated. In one embodiment, the first distance may be calculated by multiplying the second distance with a tangent of half of the field of view of the image sensor. In such an embodiment, the second distance may include a distance obtained by subtracting the distance between the third point and the image sensor from the distance of the person from the image sensor estimated. In one embodiment, the distance between the third point and the image sensor may be calculated by dividing a height of the image sensor from the ground level by a tangent of half of the field of view of the image sensor.

The method 500 also includes estimating a relative position of the person with respect to at least one of a right edge of the field of view of the image sensor and a left edge of the field of view of the image sensor in step 580. In one embodiment, estimating a relative position of the person with respect to at least one of a right edge of the field of view of the image sensor and a left edge of the field of view of the image sensor includes estimating a relative position of the person with respect to at least one of a right edge of the field of view of the image sensor and a left edge of the field of view of the image sensor by a horizontal position estimator module.

The method 500 also includes computing a range of pitch angle and a range of yaw angle based on the distance of the person from the image sensor estimated, the height of the person estimated, the relative position of the person estimated, length of the object, and width of the object in step 590. In one embodiment, computing a range of pitch angle and a range of yaw angle based on the distance of the person from the image sensor estimated, the height of the person estimated, the relative position of the person estimated, length of the object, and width of the object includes computing a range of pitch angle and a range of yaw angle based on the distance of the person from the image sensor estimated, the height of the person estimated, the relative position of the person estimated, length of the object, and width of the object by a computing module.

The method 500 also includes recognizing the gaze of the person when the pitch angle and the yaw angle of the head of the person estimated falls within the range of pitch angle and the range of yaw angle computed, thereby detecting the gaze of the person by employing the image sensor in step 600. In one embodiment, recognizing the gaze of the person when the pitch angle and the yaw angle of the head of the person estimated falls within the range of pitch angle and the range of yaw angle computed, thereby detecting the gaze of the person by employing the image sensor includes recognizing the gaze of the person when the pitch angle and the yaw angle of the head of the person estimated falls within the range of pitch angle and the range of yaw angle computed, thereby detecting the gaze of the person by employing the image sensor by a recognizing module.

Various embodiments of the system and method to detect a gaze at an object by utilizing an image sensor described above enable various advantages. The system utilizes the monocular camera, that is compact and inexpensive, thereby making the system affordable. The power consumption of the monocular camera is less compared to the stereoscopic camera, thereby ensuring extended operational time. The monocular camera rely on a single viewpoint, thereby making the placement and orientation of the same easy. Additionally, the computational resources required to process the data provided by the monocular camera is inexpensive. Combination of the various modules such as the detection module, the depth estimator module, the height estimator module the horizontal position estimator module, the computing module, the recognizing module are capable of functioning in tandem with the monocular camera to detect the gaze of the person towards the object, thereby providing a way for quantifying the engagement metrics of the advertisement. Further, the system is capable of detecting the gaze of the person by processing the data locally, thereby ensuring the data security.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system to detect a gaze at an object by utilizing an image sensor comprising:

a processing subsystem hosted on a server and configured to control bidirectional communications among a plurality of modules comprising:

a detection module operatively coupled to an integrated database, wherein the detection module is configured to:

detect at least one face of a person from one or more images received from the image sensor associated with the object by a face detection technique, wherein the person is located in a field of view of the image sensor:

identify a gender of the person based on a convolution neural network based technique;

locate two outer canthal points of the at least one face detected by a key point detection technique;

estimate a pitch angle and a yaw angle of a head of the person based on at least one of a relative position of the head with respect to the image sensor and an orientation of the head with respect to the image sensor;

a depth estimator module operatively coupled to the detection module, wherein the depth estimator module is configured to estimate a distance of the person from the image sensor based on the gender identified and the distance between the two outer canthal points located;

a height estimator module operatively coupled to the depth estimator module, wherein the height estimator module is configured to:

estimate a height of the person by adding a dimension of a body portion of the person visible in the field of view of the image sensor to a distance between a first predefined point located on the body portion of the person and a ground level when the person is partially visible in the field of view of the image sensor, wherein the first predefined point is coinciding with a bottom line of the field of view of the image sensor;

estimate the height of the person by subtracting a first distance from the dimension of the body portion of the person visible in the field of view of the image sensor when the person is located within the field of view of the image sensor at a second predefined point located in the ground level, wherein the second predefined point is located at a second distance from a third predefined point located in the ground level, wherein the third predefined point is coinciding with the bottom line of the field of view of the image sensor, wherein the first distance comprises a perpendicular distance between the ground level and a point of intersection of a vertical axis of the person and the bottom line of the image sensor;

a horizontal position estimator module operatively coupled to the height estimator module, wherein the horizontal position estimator module is configured to estimate a relative position of the person with respect to at least one of a right edge of the field of view of the image sensor and a left edge of the field of view of the image sensor;

a computing module operatively coupled to the horizontal position estimator module, wherein the computing module is configured to compute a range of pitch angle and a range of yaw angle based on the distance of the person from the image sensor estimated, the height of the person estimated, the relative position of the person estimated, length of the object, and width of the object; and a recognizing module configured to recognize the gaze of the person when the pitch angle and the yaw angle of the head of the person estimated falls within the range of pitch angle and the range of yaw angle computed, thereby detecting the gaze of the person by employing the image sensor.

2. The system of claim 1, wherein the object comprises at least one of a billboard, a signage, and a display.

3. The system of claim 1, wherein the server comprises a cloud server.

4. The system of claim 1, wherein the server comprises a local server.

5. The system of claim 1, wherein the integrated database comprises an object oriented database.

6. The system of claim 1, wherein the integrated database comprises a columnar database.

7. The system of claim 1, wherein the integrated database comprises a relational database.

8. The system of claim 1, wherein the integrated database comprises a non-relational database.

9. The system of claim 1, wherein the integrated database comprises a hierarchical database.

10. The system of claim 1, wherein the image sensor comprises a monocular camera.

11. The system of claim 1, wherein the key point detection technique comprises at least one of a haar cascade classifiers, facial landmark detection, template matching, hough transform, and active appearance models.

12. The system of claim 1, wherein the distance between the first predefined point on the body of the person and the ground level is calculated by subtracting a first result from a height of the image sensor from the ground level, wherein the first result comprises a result obtained by multiplying the distance of the person from the image sensor estimated with a tangent of half of the field of view of the image sensor.

13. The system of claim 1, wherein the dimension of the body portion of the person visible in the field of view of the image sensor comprises a length of the body portion.

14. The system of claim 1, wherein the dimension of the body portion of the person visible in the field of view of the image sensor is calculated by multiplying a ratio with the field of view of the image sensor based on the distance of the person from the image sensor estimated, wherein the ratio is obtained by dividing Fy/Fh.

15. The system of claim 1, wherein the field of view of the image sensor is calculated by multiplying a tangent of half of the field of view of the image sensor with double the distance of the person from the image sensor estimated.

16. The system of claim 1, wherein the first distance is calculated by multiplying the second distance with a tangent of half of the field of view of the image sensor, wherein the second distance comprises a distance obtained by subtracting the distance between the third point and the image sensor from the distance of the person from the image sensor estimated.

17. The system of claim 1, wherein the distance between the third point and the image sensor is calculated by dividing a height of the image sensor from the ground level by a tangent of half of the field of view of the image sensor.

18. The system of claim 1, wherein the processing subsystem comprises a tilt calibration module configured to fine tune the height of the person estimated and the relative position of the person estimated by calculating a horizontal tilt of the image sensor with respect to the ground level and a vertical tilt of the image sensor with respect to the ground level, wherein the tilt calibration module is configured to calculate the horizontal tilt of the image sensor and the vertical tilt of the image sensor based on the one or more images of a checker chart captured by the image sensor upon placing the checker chart at one or more relative positions with respect to the image sensor.

19. A method comprising:

detecting, by a detection module, at least one face of a person from one or more images received from the image sensor associated with the object by a face detection technique, wherein the person is located in a field of view of the image sensor;

identifying, by the detection module, a gender of the person based on a convolution neural network based technique;

locating, by the detection module, two outer canthal points of the at least one face detected by a key point detection technique;

estimating, by the detection module, a pitch angle, and a yaw angle of a head of the person based on at least one of a relative position of the head with respect to the image sensor and an orientation of the head with respect to the image sensor;

estimating, by a depth estimator module, a distance of the person from the image sensor based on the gender identified and the distance between the two outer canthal points located;

estimating by a height estimator module, a height of the person by adding a dimension of a body portion of the person visible in the field of view of the image sensor to a distance between a first predefined point located on the body portion of the person and a ground level when the person is partially visible in the field of view of the image sensor, wherein the first predefined point is coinciding with a bottom line of the field of view of the image sensor;

estimating, by the height estimator module, the height of the person by subtracting a first distance from the dimension of the body portion of the person visible in the field of view of the image sensor when the person is located within the field of view of the image sensor at a second predefined point located in the ground level, wherein the second predefined point is located at a second distance from a third predefined point located in the ground level, wherein the third predefined point is coinciding with the bottom line of the field of view of the image sensor, wherein the first distance comprises a perpendicular distance between the ground level and a point of intersection of a vertical axis of the person and the bottom line of the image sensor;

estimating, by a horizontal position estimator module, a relative position of the person with respect to at least one of a right edge of the field of view of the image sensor and a left edge of the field of view of the image sensor;

computing, by a computing module, a range of pitch angle and a range of yaw angle based on the distance of the person from the image sensor estimated, the height of the person estimated, the relative position of the person estimated, length of the object, and width of the object; and recognizing, by a recognizing module, the gaze of the person when the pitch angle and the yaw angle of the head of the person estimated falls within the range of pitch angle and the range of yaw angle computed, thereby detecting the gaze of the person by employing the image sensor.

* * * * *